United States Patent [19]

Paolino

[11] Patent Number: 4,616,051
[45] Date of Patent: Oct. 7, 1986

[54] COMBINATION OF PHENOLIC ANTIOXIDANT AND STABILIZER FOR USE IN ORGANIC MATERIAL

[75] Inventor: Paula A. Paolino, Watertown, Conn.

[73] Assignee: Uniroyal Chemical Company, Inc., Middlebury, Conn.

[21] Appl. No.: 417,308

[22] Filed: Sep. 13, 1982

Related U.S. Application Data

[63] Continuation-in-part of Ser. No. 259,868, May 4, 1981, abandoned, which is a continuation-in-part of Ser. No. 188,191, Sep. 18, 1980, abandoned.

[51] Int. Cl.$^4$ .......................... C08K 5/34; C08K 5/20
[52] U.S. Cl. .................................... 524/102; 524/219; 252/403
[58] Field of Search ................. 524/219, 102; 252/403

[56] References Cited

U.S. PATENT DOCUMENTS

| | | | |
|---|---|---|---|
| 4,046,737 | 9/1977 | Holt et al. | 260/45.8 N |
| 4,086,204 | 4/1978 | Cassandrini et al. | 260/45.8 NT |
| 4,154,723 | 5/1979 | Hirsch et al. | 260/45.85 B |
| 4,464,496 | 8/1984 | Nemzek et al. | 524/131 |

OTHER PUBLICATIONS

Norman S. Allen, "Catalytic Thermal Oxidation of Phenolic Antioxidants by Hindered Piperidine Compounds", Polymer Degradation & Stability, 3 (1980–1981) 73–81.
Ranby et al, Photodegradation, Photo-Oxidation and Photostabilization of Polymers–1975, pp. 412–422.
Daryl K. C. Hodgeman: "Formation of Polymer–Bonded Nitroxyl Radicals in the UV Stabilization of Polypropylene by a Bifunctional Hindered Amine Light Stabilizer", J. Polymer Science: Polymer Chem. Edition, vol. 19, 807–818 (1981).
D. J. Carlsson, D. W. Grattan and D. M. Wiles: "Light Stabilization by Tetramethylpiperidines"–Organic Coatings and Plastics Chemistry, vol. 39, 628–632 (1979) American Chemical Society.
Norman S. Allen: "Catalytic Thermal Oxidation of Phenolic Antioxidants by Hindered Piperidine Compounds"–Polymer Degradation and Stability, vol. 3, 73–81 (1980–1981).
Khirud B. Chakraborty and Gerald Scott: "Mechanisms of Antioxidant Action: The Behavior of Hindered Piperidine U.V. Stabilizers During Processing of LPDE"–Chemistry & Industry, Apr. 1, 1978, pp. 237 and 238.

Primary Examiner—Veronica P. Hoke
Attorney, Agent, or Firm—John A. Shedden

[57] ABSTRACT

Organic materials such as polypropylene are stabilized with a mixture of
(A) N,N'-bis[2-(3-[3,5-di-t-butyl-hydroxyphenyl]propionyloxy)ethyl]oxamide with one of the following stabilizers:
($B_1$) 2-hydroxy-4-n-octoxybenzophenone;
($B_2$) 2-(3,5-di-t-butyl-5-hydroxyphenyl)-5-chlorobenzotriazole; or
($B_3$) N-hydroxyethyl-2,2,6,6-tetramethylpiperidino succinic acid ester.

15 Claims, No Drawings

COMBINATION OF PHENOLIC ANTIOXIDANT AND STABILIZER FOR USE IN ORGANIC MATERIAL

This application is a continuation-in-part of copending application Ser. No. 259,868 filed May 4, 1981, now abandoned, which is a continuation-in-part of application Ser. No. 188,191, filed Sept. 18, 1980, now abandoned.

This invention relates to a combination of antioxidant and stabilizer for organic materials.

More particularly, the invention relates to stabilizing compositions comprising a mixture of
- (A) the phenolic antioxidant N,N'-bis[2-(3-[3,5-di-t-butyl-4-hydroxyphenyl]-propionyloxy)ethyl]oxamide with one of the following stabilizers:
- (B$_1$) 2-hydroxy-4-n-octoxybenzophenone;
- (B$_2$) 2-(2,5-di-t-butyl-2-hydroxyphenyl)-5-chlorobenzotriazole; or
- (B$_3$) N-hydroxyethyl-2,2,6,6-tetramethylpiperidino succinic acid ester.

The protection of organic materials, especially polymers, normally subject to deterioration over a period of time by exposure to such adverse influences as the weather (especially ultraviolet light), by the addition of various antioxidants and stabilizers has previously been known, but it has been desired to provide more satisfactory protection in an economical and convenient manner.

Typical prior stabilization practices are illustrated in Canadian Ser. No. 318,249, Hirsch et al., Dec. 20, 1978; U.S. Pat. Nos. 2,154,723, Hirsch et al; May 15, 1979; 4,187,212, Zinka et al; Feb. 5, 1980; and 4,104,248, Cantatore, Aug. 1, 1978.

The present invention is based on the surprising discovery that a remarkably high level of protection is achieved by employing a combination of the phenolic antioxidant (A) described above with one of the stabilizers (B) described above, as the stabilizer system.

The phenolic antioxidant (A) and the stabilizers (B) described above employed in the stabilizing mixtures of the invention are known materials.

The ratio of phenolic antioxidant compound (A) to stabilizer compound (B) employed in the mixed stabilizer composition of invention may vary widely, for example from 1:9 to 9:1, preferably from 2:8 to 8:2, and more preferably from 4:6 to 6:4, by weight.

The stabilize an organic material in accordance with the invention the material is mixed, by any suitable conventional means, with the phenolic antioxidant compound (A) and one of the described stabilizer compounds (B), separately or together, in a stabilizingly effective amount. Remarkably small quantities of the mixed stabilizer composition of the invention are effective. e.g., from 0.005% or less to 5% or more, preferably from 0.05 to 1%, more preferably from 0.1 to 0.5%, based on the weight of the material to be stabilized. The optimum amount in any given case will depend on such variables as the degree of stabilization desired, the particular material being stabilized, etc., and is readily determinable with the aid of standard tests for evaluating stabilizers in various materials.

If desired, the stabilizer composition of the invention can be employed in combination with other stabilizers, e.g. dilauryl or distearyl beta-thiodipropionate, antiozonants, thermal stabilizers, ultraviolet light absorbers and/or with coloring materials, dyes, pigments, metal chelating agents, etc.

The organic materials which can be stabilized in accordance with this invention by admixing with phenolic antioxidant (A) and stabilizer (B) include polyolefins which can be homopolymers of unsubstituted olefinic hydrocarbons such as, e.g. ethylene, propylene, 1-butylene, 1,3-butadiene and styrene, homopolymers of substituted olefinic hydrocarbons such as. e.g. vinyl halides such as vinyl chloride and esters such as acetate, vinyl alcohols, acrylonitrile and methacrylonitrile, or copolymers of two or more of such substituted and/or unsubstituted olefinic hydrocarbons. Also included are condensation polymers such as, e.g. polyalkylene oxides, polyurethanes, polycarbonates, polyesters such as polyethylene terephthalates and polyamides such as polyhexamethylene adipamide and polycaprolactam. Other organic materials which can be stabilized by this invention include lubricating oils, e.g. of the aliphatic ester type such as di(2-ethylhexyl)azelate and pentaerythritol tetracaprolate, animal and vegetable derived oils such as linseed oil, fat, tallow, lard, peanut oil, cod liver oil, caster oil, palm oil, corn oil and cottonseed oil, fatty acids such as soaps, and other hydrocarbon material such as gasoline, mineral oil, fuel oil, drying oil, cutting fluids and waxes.

It is possible with the stabilizer mixture according to the invention to stabilize, for example, the following polyolefins:

1. polymers that are derived from singly unsaturated hydrocarbons, such as polyolefins, e.g. polyethylene of low and high density, which can optionally be cross-linked, polypropylene, polyisobutylene, polymethylbutene-1 and polymethylphentene-1;
2. mixtures of the homopolymers mentioned under 1, such as mixtures of polypropylene and polyethylene, polypropylene and polybutene-1, polypropylene and polyisobutylene;
3. copolymers of the monomers on which the homopolymers mentioned under 1 are based such as ethylene/propylene copolymers, propylene/butene-1 copolymers, propylene/isobutylene copolymers, ethylene/butene-1 copolymers, as well as terpolymers of ethylene and propylene with a diene, such as hexadiene, di-cyclopentadiene or ethylidenenorbornene.

The following examples, in which all quantities are expressed by weight unless otherwise indicated, will serve to illustrate the practice of the invention in more detail.

EXAMPLE 1

This example illustrates the stabilization of polypropylene resin with a combination of phenolic antioxidant and stabilizer identified as follows in Table I:

Phenolic antioxidant A:
 N,N'-bis[2-(3-[3,5di-t-butyl-4-hydroxyphenyl]propionyloxy)ethyl]oxamide, "BPEO".

Stabilizer B$_1$:
 2-hydroxy-4-n-octoxybenzophenone, "HOBP".

The effectiveness of the stabilizer combinations is evaluated by observing changes in ultimate tensile strength upon prolonged exposure to simulated outdoor weathering conditions. Control stock containing no stabilizer (Run 1 in Table I), or the phenolic antioxidant component alone or stabilizer component alone (Runs 2 and 3 in Table I) are included for comparison with a stock of the invention containing both the phenolic antioxidant (A) and the stabilizer (B) (Run 4 in Table I).

The stocks represented in Table I are prepared by dry mixing in a Hobart [trademark] mixer 100 parts of unstabilized powered polypropylene (average molecular weight about 72,000; "Profax 6501" [trademark] with 0.1 part of phenolic antioxidant A and 0.3 part of the stabilizer B₁. The mixtures are extruded on a 1½" Davis Standard (trademark) extruder containing three screens (60/80/100 mesh) and a ¾" bar die (length to diameter ratio 30:1). The extrusion is conducted with the following temperature profile: feed 193°; transition 197°, 204°; metering 210°, 215°; and die 221° C. at 20 RPM. The extrudate is chopped and injection molded on an Ankerwerke (trademark) machine with rear, middle and front temperatures of 182° C., mold temperature at 52° C., into T-bars of dimensions 8¼" long by ⅛" thick by ½" wide. The T-bars are aged in an Atlas Sunshine Arc Weatherometer (trademark) model XW-W with conditions 63° C. spray mist rate of 18 minutes every 2 hours. The samples are tested for tensile strength at break according to ASTM D638 Type I, dumbell specimens at a rate of 2" per minute.

The results after 1200 hours exposure are shown in Table I.

The data in Table I indicate the marked improvement in retained tentile strength using the antioxidant/stabilizer in the combination of this invention rather than alone.

TABLE I

| | Aging of Stabilized Polypropylene | | | |
|---|---|---|---|---|
| Run No.: | 1 | 2 | 3 | 4 |
| Composition (parts) | | | | |
| Polypropylene | 100 | 100 | 100 | 100 |
| BPEO | — | .1 | — | .1 |
| HOBP | — | — | .3 | .3 |
| Tensile Strength (psi) | | | | |
| Aged | | | | |
| 0 hrs | 5590 | 5615 | 5600 | 5560 |
| 1200 hrs | 3510 | 3500 | 4070 | 5370 |
| % Change | −37.2 | −37.7 | −27.3 | −3.4 |

EXAMPLE 2

Polypropylene resin, Profax 6501 (Trademark), was dry blended with antioxidant (A) [BPEO; N,N'-bis[2-(3-[3,5-di-t-butyl-4-hydroxyphenyl]propionyloxy)ethyl-]oxamide] and/or stabilizer (B₁) [HOBP; 2-hydroxy-4-n-oxtoxybenzophenone] at the amounts indicated in Table II and then mixed in a Brabender (Trademark) mixer for five minutes at 400° F. (204° C.) and 25 RPM. A film was prepared by placing 7 g of compounded resin between ferro-type plates spaced apart by a 10 mil frame. The assembly was placed into a press, pre-heated for three minutes at 370° F. (188° C.), degassed several times and then kept for two minutes at 25,000 psi pressure. After quenching in cold water, the dried film was exposed in a Xenon weatherometer at 60°–80° C., 50% relative humidity and at maximum UV irradiation of 280–300 nm, for periods of exposure indicated in Table II. The carbonyl index (CI) of the exposed samples was determined by infrared spectroscopy in this manner:

The optical density (OD) at 1720 cm⁻¹ (baseline tangential to the absorption minima at 1810 and 1580 cm⁻¹) measured and the following calculation carried out:

$$CI(moles/l) = OD/E \cdot S$$

Wherein E = Molar extinction coefficient (3,000 1/mol cm). S = Sample thickness, cm.

TABLE II

| Run No.: | 5 | 6 | 7 | Blank |
|---|---|---|---|---|
| Composition (parts) | | | | |
| Polypropylene | 100 | 100 | 100 | 100 |
| Antioxidant A | 0.1 | — | 0.05 | — |
| Stabilizer B₁ | — | 0.1 | 0.05 | — |
| RESULTS | 1 | 2 | 3 | Blank |
| CI, Unaged | 36 | 31 | 34 | 37 |
| CI, Aged 202 Hours | 55 | 50 | 50 | 344 |
| CI, Aged 428 Hours | 846 | 469 | 121 | 2000+ |
| CI, Aged 600 Hours | 1282 | 1321 | 937 | (Off Scale) |

Carbonyl Index = reported number × 10⁻⁵

It will be apparent from the results shown in Table II that Run No. 7, which represents the invention and contained both (A) and (B₁), provided a synergistic effect in the form of remarkably reduced CI, as compared to Run No. 5 containing (A) alone and Run No. 6 containing (B₁) alone (all three runs containing the same total amount of protective material.

EXAMPLE 3

This example illustrates the synergistic effect obtained with combinations of the phenolic antioxidant A (BPEO) with stabilizer B₂ ["TBCB"; 2-(3,5-di-t-butyl-2-hydroxyphenyl)-5-chlorobenzotriazole] or stabilizer B₃ ["SATM"; Tinuvin (trademark) 622, belived to be N-hydroxyethyl-2,2,6,6-tetramethylpiperidino succinic acid ester], as shown in Table III.

TABLE III

| Run No.: | 8⁽³⁾ | 9 | 10 | 11 | 12 | Blank⁽⁴⁾ |
|---|---|---|---|---|---|---|
| Composition (parts) | | | | | | |
| Polypropylene | 100 | 100 | 100 | 100 | 100 | 100 |
| BPEO | 0.1 | — | — | 0.05 | 0.05 | — |
| TBCB⁽¹⁾ | — | 0.1 | — | 0.05 | — | — |
| SATM⁽²⁾ | — | — | 0.1 | — | 0.05 | — |
| RESULTS | | | | | | |
| CI, Unaged | 36 | 37 | 63 | 31 | 52 | 37 |
| CI, Aged 202 Hours | 55 | 75 | 89 | 32 | 55 | 344 |
| CI, Aged 428 Hours | 846 | 615 | 618 | 82 | 306 | 2000+ |
| CI, Aged 600 Hours | 1282 | 639 | 1759 | 483 | 361 | (Off Scale) |

CI = reported number × 10⁻⁵
Remarks
⁽¹⁾2-(3,5-di-t-butyl-2-hydroxyphenyl)-5-chlorobenzotriazole.
⁽²⁾Tinuvin (trademark) 622, believed to be N—hydroxyethyl-2,2,6,6-tetramethyl-piperidino succinic acid ester.
⁽³⁾Same experiment as Table II Run 5.
⁽⁴⁾Same blank as in Table II.

The synergistic effect obtained with runs 11 and 12 of the invention is apparent in Table III.

EXAMPLE 4

This example illustrates that combinations of phenolic antioxidants A (from Example 1) and U.V. stabilizers do not yield synergistic results, while also showing the unexpected synergism of resulting from combining phenolic antioxidant A with stabilizer B₃ (as defined in Example 3). The following experiments were performed according to the procedure of Example 2.

TABLE IV

Evaluation of Various Hindered Amine U.V. Stabilizers with Phenolic Oxamide Antioxidants

| Run No. | 1 | 2 | 3 | 4 | 5 | 6 | 7* | 8 | 9 | 10 | 11 | 12 |
|---|---|---|---|---|---|---|---|---|---|---|---|---|
| A | .2 | — | — | — | — | — | .1 | .1 | .1 | .1 | .1 | — |
| $B_3$ | — | .2 | — | — | — | — | .1 | — | — | — | — | — |
| I | — | — | .2 | — | — | — | — | .1 | — | — | — | — |
| II | — | — | — | .2 | — | — | — | — | .1 | — | — | — |
| III | — | — | — | — | .2 | — | — | — | — | .1 | — | — |
| IV | — | — | — | — | — | .2 | — | — | — | — | .1 | — |
| *Aging Results, carbonyl index after hours indicated* | | | | | | | | | | | | |
| 200 | 567 | 120 | 42 | 56 | 65 | 34 | 68 | 52 | 67 | 72 | 48 | 2370** |
| 431 | 2748** | 321 | 60 | 64 | 65 | 54 | 140 | 86 | — | 82 | 88 | — |
| 616 | — | 2949** | 119** | 64 | 222 | 186 | 2208** | 218** | 280 | 938 | 791 | — |
| 801 | — | — | — | 299 | 676 | 353 | — | — | 681 | 2458** | 2116** | — |

Remarks:
*Invention
**Sample disintegrated
I (770) = bis[2,2,6,6,-tetramethyl-4-piperidine]sebacate.
II (144) = bis[1,2,2,6,6-pentamethyl-4-piperidinyl]-2-n-butyl-2-(3,5-di-t-butyl-4-hydroxybenzyl)malonate.
III (A36) = oligomeric copolymer of N,N'—bis[2,2,6,6-tetramethyl-4-piperidyl]hexamethylenediamine with 1,2-dibromoethane.
IV (944) = poly[N,N—bis(2,2,6,6-tetramethylpiperid-4-yl]-N—[4-(1,1,3,3-tetramethylbutylamino)-1,3,5-triazine-2,6-diyl]hexamethylenediamine.

None of the combinations of Runs 8–11 show any synergistic effect, while run 7, the combination covered by applicant's invention, shows an unexpected synergistic result.

What is claimed is:

1. A stabilized organic composition comprising an organic material and a stabilizer wherein the stabilizer comprises a mixture of:
   (A) the phenolic antioxidant N,N'-bis[2-(3-[3,5-di-t-butyl-4-hydroxyphenyl]propionyloxy)ethyl]oxamide with one of the following stabilizers:
   ($B_1$) 2-hydroxy-4-n-octoxybenzophenone,
   ($B_2$) 2-(3,5-di-t-butyl-2-hydroxyphenyl-5-chlorobenzotriazole, or
   ($B_3$) N-hydroxyethyl-2,2,6,6-tetramethylpiperidino succinic acid ester, wherein the ratio of A/$B_1$, A/$B_2$, or A/$B_3$ is from 1/9 to 9/1 and the stabilizer is from 0.005–5% by weight of the organic material.

2. A composition of claim 1 wherein the stabilizer is from 0.1 to 0.5% by weight of the organic material.

3. A composition of claim 2 wherein said organic material comprises a polyolefin, a condensation polymer, lubricating oil, an animal or vegetable derived oil, fatty acid, gasoline, mineral oil, fuel oil, drying oil, and cutting fluids or waxes.

4. The composition of claim 2 wherein said organic material comprises a polyolefin.

5. A stabilized composition of claim 2 wherein said organic material comprises a homopolymer of unsubstituted olefinic hydrocarbons.

6. A method of preparing the composition of claim 1 comprising mixing said material with said mixture of stabilizers.

7. A method as in claim 6 in which the said organic material is polypropylene.

8. A stabilized composition comprising a poly mono-olefin and a stabilizer wherein the stabilizer comprises a mixture of:
   (A) the phenolic antioxidant N,N'-bis[2-(3-[3,5di-t-butyl-4-hydroxyphenyl]propionyloxy)ethyl]oxamide with the following stabilizer:
   ($B_3$) N-hydroxyethyl-2,2,6,6-tetramethylpiperidino succinic acid ester wherein the ratio of A/$B_3$ is about 1 to 1
and the stabilizer is about 0.2 parts per hundred of poly mono-olefin.

9. A stabilized organic composition comprising an organic material and a stabilizer wherein the stabilizer comprises a mixture of
   (A) the phenolic antioxidant N,N'-bis[2-(3-[3,5-di-t-butyl-4-hydroxyphenyl]propionyloxy)ethyl]oxamide with the following stabilizer:
   ($B_1$) 2-hydroxy-4-n-octoxybenzophenone
wherein the ratio of the phenolic antioxidant to the stabilizer is from 1/9 to 9/1 and the stabilizer is from 0.005–5% by weight of the organic material.

10. A stabilized organic composition comprising an organic material and a stabilizer wherein the stabilizer comprises a mixture of
    (A) the phenolic antioxidant N,N'-bis[2-(3-[3,5-di-t-butyl-4-hydroxyphenyl]propionyloxy)ethyl]oxamide with the following stabilizer:
    ($B_2$) 2-(3,5-di-t-butyl-2-hydroxphenyl-5-chlorobenzotriazole
wherein the ratio of the phenolic antioxidant to the stabilizer is from 1/9 to 9/1 and the stabilizer is from 0.005–5% by weight of the organic material.

11. A stabilized composition comprising an organic material and a stabilizer wherein the stabilizer comprises a mixture of
    (A) the phenolic antioxidant N,N'-bis[2-(3-[3,5-di-t-butyl-4-hydroxyphenyl]propionyloxy)ethyl]oxamide with the following stabilizer:
    ($B_3$) N-hydroxyethyl-2,2,6,6-tetramethylpiperidino succinic acid ester, wherein the ratio of A/$B_3$ is from 1/9 to 9/1
and the stabilizer is from 0.005–5% by weight of the organic material.

12. A stabilizing composition comprising a mixture of
    (A) the phenolic antioxidant N,N'-bis[2-(3-[3,5-di-t-butyl-4-hydroxyphenyl]propionyloxy)ethyl]oxamide with one of the following stabilizers:
    ($B_1$) 2-hydroxy-4-n-octoxybenzophenone,
    ($B_2$) 2-(3,5-di-t-butyl-2-hydroxyphenyl-5-chlorobenzotriazole, or
    ($B_3$) N-hydroxyethyl-2,2,6,6-tetramethylpiperidino succinic acid ester; wherein the ratio of a/$B_1$, A/$B_2$, or A/$B_3$ is from 1/9 to 9/1.

13. The stabilizing composition of claim 12 which is a mixture of (A) and ($B_1$).

14. The stabilizing composition of claim 12 which is a mixture of (A) and ($B_2$).

15. The stabilizing composition of claim 12 which is a mixture of (A) and ($B_3$).

* * * * *